Sept. 9, 1924.  1,507,973
G. A. MOHN
WATER FAUCET
Filed Feb. 17, 1923   2 Sheets-Sheet 1
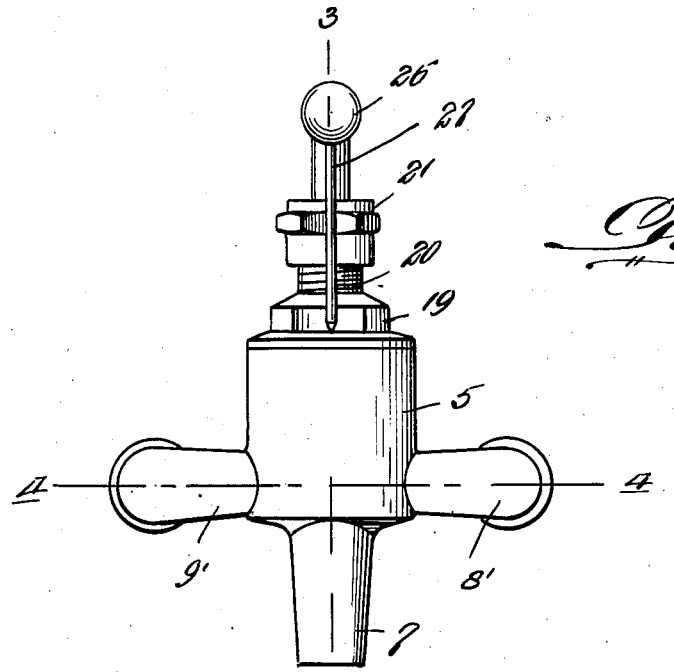
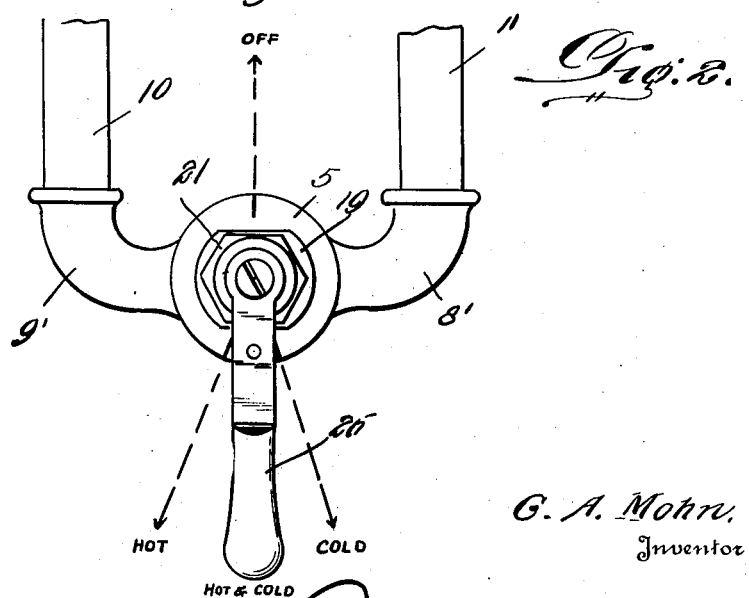
G. A. Mohn,
Inventor
Witnesses:

Sept. 9, 1924.  1,507,973
G. A. MOHN
WATER FAUCET
Filed Feb. 17, 1923   2 Sheets-Sheet 2

Witnesses:
F. L. Fox.
H. Berman

G. A. Mohn,
Inventor

Clarence A. O'Brien
Attorney

Patented Sept. 9, 1924.

1,507,973

UNITED STATES PATENT OFFICE.

GEORGE A. MOHN, OF POTTSTOWN, PENNSYLVANIA.

WATER FAUCET.

Application filed February 17, 1923. Serial No. 619,575.

*To all whom it may concern:*

Be it known that I, GEORGE A. MOHN, citizen of the United States, residing at Pottstown, in the county of Montgomery and State of Pennsylvania, have invented certain new and useful Improvements in Water Faucets, of which the following is a specification.

The primary object of my said invention resides in the provision of a water faucet adapted to be used in conjunction with both a hot and a cold water pipe, wherein the faucet may be so manipulated as to release either the hot or cold water, or a combination of both.

The further object of my invention resides in the provision of such a faucet that is comparatively simple of construction, the same embodying relatively few parts, and these so co-related as to reduce the liability of derangement to a minimum.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1 is a front elevational view of a faucet constructed in accordance with my invention.

Figure 2 is a top plan view thereof.

Figure 3:
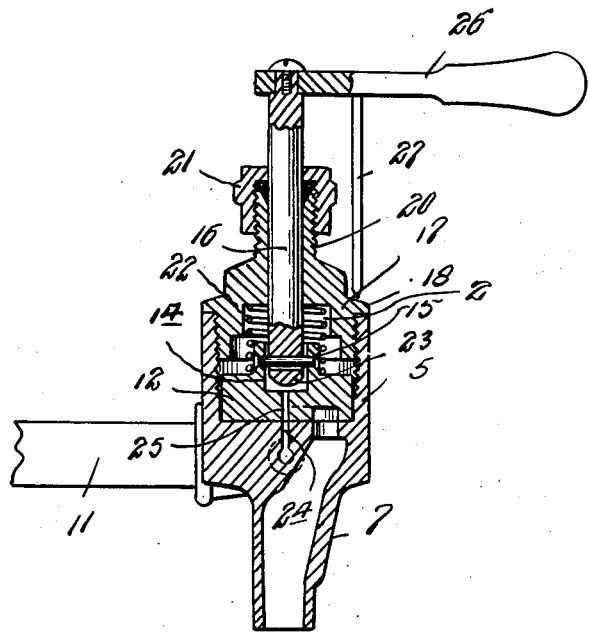
Figure 3 is a vertical sectional view, taken substantially upon the line 3—3 of Figure 1.
Figure 5:
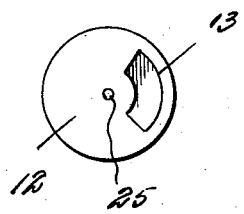
Figure 5 is a bottom plan view of the faucet valve 4 per se.
Figure 4:
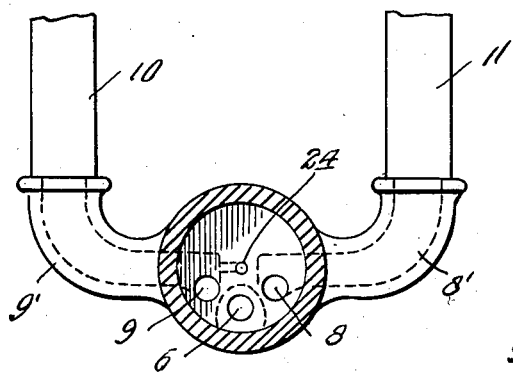
Figure 4 is a transverse cross sectional view upon the line 4—4 of the same figure.
Figure 6:
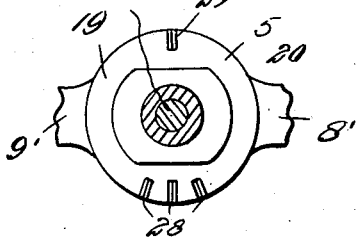
Figure 6 is a sectional view through a portion of the faucet casing for more clearly disclosing the indicating marks for ascertaining the position of the faucet valve.

Referring to the drawings in detail, my faucet consists of an internally screw threaded tubular casing 5 the bottom wall of which is formed with an outlet 6 in communication with a pendant nozzle 7 formed upon the said bottom wall of the tubular casing. Upon the opposite sides of the said outlet opening 6, the bottom wall of the casing is further provided with inlet openings 8 and 9, the same being in communication with laterally extending inlet nipples 8' and 9' respectively, the ends of which are adapted to receive the outlet ends of hot and cold water pipes 10 and 11 respectively.

Within the casing 5 is a disk valve 12, upon the bottom face of which is formed an arcuate channel 13, the length of this channel being equivalent to the distance between the said water inlet openings 8 and 9, within the bottom wall of the casing 5. The top wall of the disk valve 12 is formed with a socket 14, within which is pivotally secured, through the instrumentality of a cross pin 15, the lower end of an operating stem 16, it being understood that the diameter of the stem 16 is less than the similar dimension of the said socket for permitting a slight universal movement of the valve 12 upon the said stem.

Screw threaded within the said screw threaded casing 5 is a lower end of a valve head 17, the same being formed with a flange 18 for engagement upon the upper end of the said valve casing. The head 17 is formed with a central vertical opening for the reception of the said stem 16, this head being also formed with an angular portion 19 as well as an externally screw threaded neck 20, upon the upper end of which is a packing nut 21.

Surrounding the lower end of the stem 16, and engaging at one end with a socket 2 formed in the lower end of the head 17, and in position at its opposite end upon the valve 12 is an expansion spring 22 which effects one means of maintaining the valve in face to face contact with the bottom wall of the casing 5. Formed centrally of the bottom wall of the casing 5 is a vertical pressure inlet opening 24, the lower end of which is in communication with the hot water inlet nozzle 9'. In alignment with the pressure inlet 24, in the casing 5, is a water passage 25 through the disk valve 12 which will permit the water pressure to flow into the casing 5 between the upper face of the disk valve 12 and the lower end of the head 17 for consequently co-operating with the said expansion spring 22 for effectively maintaining said disk valve 12 in face to face contact with the bottom wall of the casing.

Upon the upper end of the stem 16 there is removably arranged one end of an operating lever 26, the same carrying a relatively elongated pendant pin or rod 27. The lower end of this pin or rod terminates directly above the flange 18 of the valve head 17, this flange being formed at its front side with three spaced indicating marks 28, together with an indicating mark 29 directly rearwardly of the central indicating mark 28 upon the front side of the flange.

In view of the above description, it will at once be apparent that when the operating lever 26 is turned to a position wherein the pin or rod 27 is somewhat adjacent the single indicating mark 29, the flow of water through either of the pipes 10 or 11 will be off. Should the lever 26 be turned to a position wherein the pin 27 is in the position above either of the outer marks 28 upon the front side of the head flange 18, the flow of water will be from either the hot or cold water pipes 10 or 11 respectively. Should, however, the lever be turned to a position substantially centrally between the outer marks 28, the flow of water will be from both hot and cold water pipes, it being, of course, understood that the length of arcuate channel 13 within the disk valve 12 is such as to permit the flow of water through both of the outlet openings 8 and 9 of the casing 5, and consequently through the outlet opening 6 in the casing as well as the nozzle 7.

In view of the above description, it will be at once apparent that I have provided a highly improved form of water faucet, and one that will effectively dispense with the usual necessity of providing a separate faucet for the hot and cold water pipes in plumbing systems, and although I have herein shown and described the preferred embodiment of my invention, it is nevertheless to be understood that minor changes may be made therein without departing from the spirit and scope of the invention as claimed.

Having thus described my invention, what I claim as new and desire to secure by Letters Patent, is:—

A faucet comprising a casing having spaced inlet nozzles and an outlet nozzle positioned midway between the inlet nozzles, said casing having a valve chamber and being provided with a duct which communicates with one of the inlet nozzles and having an end portion disposed vertically and centrally in the valve chamber, a valve member located in the valve chamber and adapted to turn therein and move longitudinally thereof, said valve being provided with a centrally located duct which permanently registers with the duct located in the bottom wall of the valve chamber, the valve casing being provided with openings which register with the inlet and outlet nozzles and the valve chamber, a hood for the casing, a valve stem passing through the hood and loosely connected with the valve member and having its axis aligned with the openings in the valve member, a spring interposed between the hood and the valve member and being under tension with a tendency to normally hold the valve member toward the bottom of the valve chamber, the valve member being provided at its lower portion with an arcuate channel adapted to be moved to a position out of register with both of the inlet openings in the bottom of the valve chamber and being of such length that it may be simultaneously brought into register with the outlet nozzle of the valve chamber and either of the openings in the bottom wall of the valve chamber which communicate with the respective inlet nozzles.

In testimony whereof, I affix my signature.

GEORGE A. MOHN